Patented May 6, 1924.

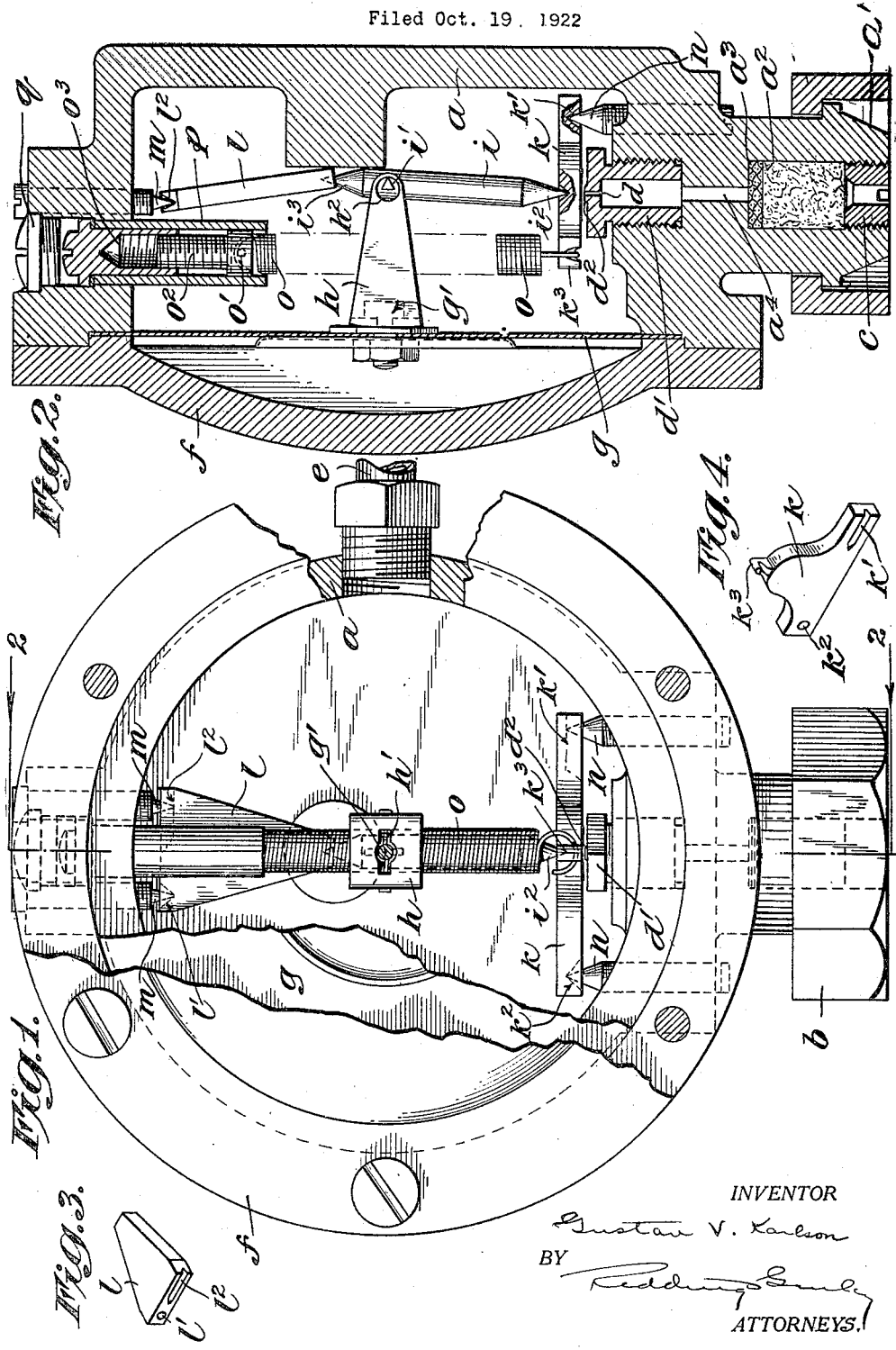

1,492,565

UNITED STATES PATENT OFFICE.

GUSTAV V. KARLSON, OF ELIZABETH, NEW JERSEY, ASSIGNOR TO CHILLINGWORTH ENGINEERING CORPORATION, OF NEW YORK, N. Y., A CORPORATION OF NEW YORK.

PRESSURE-REDUCING VALVE.

Application filed October 19, 1922. Serial No. 595,505.

*To all whom it may concern:*

Be it known that I, GUSTAV V. KARLSON, a citizen of the United States, residing at Elizabeth, in the State of New Jersey, have invented certain new and useful Improvements in Pressure-Reducing Valves, of which the following is a specification, reference being had to the accompanying drawings, forming a part hereof.

This invention relates to a pressure reducing valve or gas regulator generally applicable in any situation where accurate control of reduced gas pressure is desirable, but designed primarily with reference to its use for regulation of gas pressure in a signal flasher. It has been found in practice that pressure reducing valves do not maintain uniform accuracy under varying temperatures due, doubtless, to variations in friction between moving parts at different temperatures. The principal object of the present invention is to provide a pressure reducing valve which shall be accurate under all temperatures and insure the delivery of gas to the chamber at a predetermined pressure. In accordance with the invention it is proposed to eliminate frictional resistance opposing moving of the parts to a degree where variations in temperature will not sensibly change such frictional resistance. All moving parts in the improved construction are mounted on anti-friction bearings.

A further object of the present invention is to insure a sensitive valve which shall have a comparatively small range of movement and which shall be actuated through a toggle connection against the action of a retracting spring for seating on the port.

Still another object of the invention is to provide a flat valve seat and a flat valve cooperating therewith and movable onto and away from the seat in such manner as to effect substantially the closing or opening of the entire area of the port at the instant of movement. The importance of such relation of parts will be understood where the necessity of having the benefit of the full port opening and a port opening of relatively great area is understood. Since the pressure of the tank opposes the seating of the valve the toggle connection referred to above becomes of especial importance in the combination of parts since the thrust on the valve becomes more direct with the straightening of the toggle upon the expansion of the diaphragm.

Other objects of the invention are to provide a device of the character described which shall be of simple and inexpensive construction and characterized by fewness of parts any one of which may be readily removed for purposes of inspection or repair.

The invention will be described with greater particularity hereinafter in connection with one practical embodiment of the invention as illustrated in the accompanying drawings, wherein:

Figure 1 is a view in plan of the improved regulator, parts being broken away in the interest of clearness.

Figure 2 is a view in section of the regulator shown in Figure 1 and taken on the plane indicated by the line 2—2 of Figure 1 and looking in the direction of the arrows.

Figure 3 is a view in perspective showing one of the elements of the toggle connection.

Figure 4 is a view in perspective of the improved valve unit.

The reducing chamber $a$ may be connected to the pressure tank through a union nut $b$ which may draw the tank connection onto a tapered nipple $a'$ formed with the chamber. In the channel through the nipple $a'$ may be provided an enlarged chamber $a^2$ to receive suitable filtering material $a^3$ retained in place by an apertured plug $c$ threaded in the end of the nipple. From the chamber $a^2$ the gas may pass through a duct $a^4$ and be discharged into the chamber through a restricted port $d$ formed in a removable nozzle $d'$ which may be threaded in the inner wall of the chamber $a$. The nozzle $d'$ is provided on its inner face with a relatively broad flat valve seat $d^2$ through which the port $d$ extends. Gas entering the chamber from the pressure tank is to be reduced to a predetermined pressure before escaping through the discharge pipe $e$ to the apparatus where it is to be used. As the description proceeds it will be understood that the device is useful wherever such reduction is to be brought about although the illustrated embodiment of the invention shows a regulator which is especially designed with reference to its use in a signal flasher.

The chamber $a$ may be closed by a removable cap $f$ which serves to clamp the controlling diaphragm $g$ in place this diaphragm being movable under variations in pressure within the chamber to actuate intermittently the valve unit by which the amount of inflow of gas to the chamber is controlled. The invention is concerned primarily with the actuating mechanism for the valve unit. As shown, the diaphragm $g$ has connected thereto, preferably on its axis, a depending forked stirrup $h$ which may be engaged with the diaphragm through a slotted bayonet connection represented as composing an elongated slot $h'$ in the top web of the stirrup and a depending revoluble hook $g'$ carried with the diaphragm. By introducing the hook $g'$ through the slot $h'$ and revolving it, it will engage the stirrup to effect the connection between it and the diaphragm. When the diaphragm is to be removed it may be disengaged from the stirrup by contrary action. The lower ends of the stirrup $h$ may be formed with openings $h^2$ to receive studs $i$ carried at diametrically opposite sides of a pin $i'$. To reduce the friction between the stirrup $h$ and the pins $i$ the latter may be formed with knife edges engaging the openings, $h^2$, respectively. The pin $i$ is pointed at its opposite ends and one end $i^2$ is seated in an opening provided therefor in the reverse face of the valve unit $k$ and the other end $i^3$ is seated in an opening provided therefor in a swinging lever piece $l$. This last-named piece $l$ is shown in detail in Figure 3 and may have at its rear end an opening $l'$ and a groove $l^2$ to receive, respectively, anti-friction pins $m$ on which the piece $l$ is journaled to swing without friction. The disposition of the parts $i$ and $l$ is such, as illustrated in Figure 2, as to constitute a toggle, the point $i^3$ of the pin $i$ normally falling below the center line extending from the pins $m$ to the point $i^2$. The studs $i'$ which are engaged by the stirrup $h$ are near the point of engagement between the piece $l$ and the point $i^3$.

The valve unit $k$ which is shown in Figure 4 is pivotally supported on anti-friction pins $n$ $n'$, which may rest in a groove $k'$ and recess $k^2$, respectively, formed adjacent the lower edge of the valve unit. The pins $n$ like all of the other journal elements described afford an anti-friction support for the swinging valve $k$. Adjacent the upper end of the valve is engaged a retracting spring $o$ which may be looped over a hook $k^3$ carried with the valve. The spring $o$ extends in a direction parallel to the line of movement of the valve $k$ and has its other end $o'$ engaged with an adjustable spring seat indicated as a threaded stud $o^2$ and rotatable sleeve $o^3$ both of which are disposed within the wall of the chamber $a$. A barrel $p$ supports the stud $o^2$ for sliding movement under the influence of the threaded sleeve $o^3$ and these moving elements may be wholly incased by a plug cap $q$ threaded in the wall of the chamber $a$. Removal of the plug cap $q$ affords access to the head of the sleeve $o^3$ for adjustment of the spring tension.

The description given will make the action plain. The valve $k$ which is supported on the anti-friction points $n$ is normally held away from its seat $d^2$ by means of the spring $o$. Increase of gas pressure within the chamber $a$ through the inflow of high pressure gas through the port $d$ will expand the diaphragm $g$. Movement of the diaphragm $g$ will cause the stirrup $h$ to pull up on the toggle pin $i'$, the anti-friction points $i^2$, $i^3$, and $m$, of the toggle insuring negligible frictional resistances to the straightening of the toggle. The pull is transmitted along the pin $i'$ and impressed as a direct thrust on the valve $k$ moving it to its seat quickly and closing the port $d$ against the action of the spring $o$. By the provision of a swinging valve $k$ having a flat surface to seat on the flat seat $d^2$ the range of movement of the valve may be very slight and the opening and closing of the port $d$ effected upon the instant. This insures a highly sensitive control affording ready entrance to the gas from the pressure tank and a quick cut off when the pressure within the chamber has reached the predetermined amount. When the valve $k$ is seated it is subject to the pull of the spring $o$ and the pressure of the gas from the tank. This latter factor determines, within reasonable limits, the permissible area of the port $d$ since it is evident that the design must be such that the pull of the diaphragm $q$ will effectively maintain the valve closed against these pressures until the pressure within the chamber $a$ drops below the predetermined amount. The direct thrust impressed on the valve through the toggle connection is one of the most important features of the invention in that it insures a quick and sensitive action with minimum friction and adequate thrust. The tension of the spring $o$ will, of course, determine the differential pressure at which the valve will be seated and opened, for a given tank pressure and a given diaphragm. Changes in temperature will not affect the accuracy of the operation since all of the joints are anti-friction and their resistances are negligible under all circumstances. The parts are of simple construction readily accessible and easy to assemble and disassemble.

Changes in design will suggest themselves to one skilled in the art but will not avoid the invention so long as the principles and characteristics referred to are retained with the attendant advantages.

What I claim is:

1. In a pressure reducing valve in combination with a chamber provided with inlet and outlet ports, and a diaphragm, a flat valve seat for the port, a flat valve to cooperate with said seat mounted in swinging relation thereto on an anti-friction bearing, a toggle connection between the valve and the diaphragm including a link having an anti-friction point engaging the valve, a second link engaged with the other end of the first named link through an anti-friction joint, an anti-friction support for the remote end of the second named link means connecting the diaphragm with the first named link and an adjustable spring to retract the valve from its seat.

2. In a pressure reducing valve in combination with a chamber provided with inlet and outlet ports, and a diaphragm, a flat swinging valve to control said inlet port, an anti-friction mounting for the valve, an adjustable spring to retract the valve from its seat, a toggle connection engaged with the valve at a point between the spring and the anti-friction support for the valve and connected operatively with the diaphragm and anti-friction connections between all of the relatively movable elements.

3. In a pressure reducing valve in combination with a chamber provided with inlet and outlet ports, and a diaphragm, a valve mounted vertically to control the inlet port, anti-friction pins parallel to the inlet port and supporting said valve, an adjustable spring engaged with the valve above the inlet port and extending across the chamber parallel to the inlet port, a toggle connection engaged with the valve between the spring and its support and extending across the chamber generally parallel to the inlet port, anti-friction bearings between all of the relatively movable elements of the toggle connection, anti-friction pins on which one of the elements of the toggle connection bears, disposed parallel to the inlet port, and a depending stirrup carried with the diaphragm and engaging one of the elements of the toggle connection off center to translate movement of the diaphragm into thrust against the valve.

This specification signed this 17 day of October, A. D. 1922.

GUSTAV V. KARLSON.